Feb. 28, 1967 R. B. MEDEIROS 3,306,447
WATER PURIFICATION SYSTEM
Filed Nov. 15, 1963
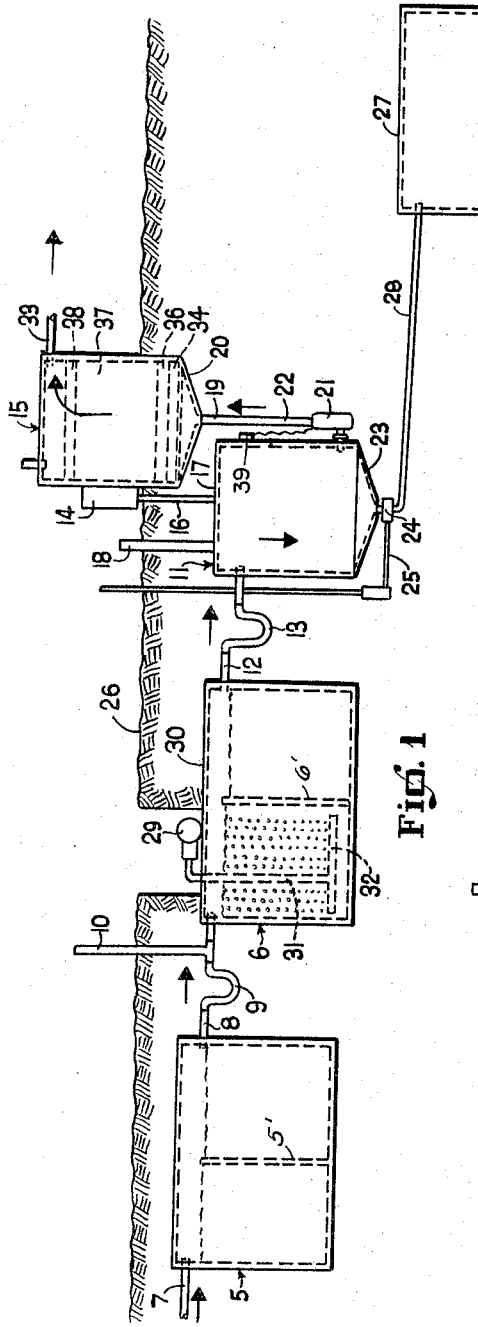
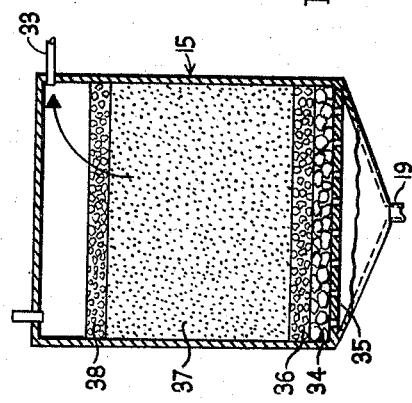
INVENTOR
*Robert B. Medeiros.*

United States Patent Office 3,306,447
Patented Feb. 28, 1967

3,306,447
WATER PURIFICATION SYSTEM
Robert B. Medeiros, 7 Meadowbrook Ave.,
Sonoma, Calif. 95476
Filed Nov. 15, 1963, Ser. No. 324,099
2 Claims. (Cl. 210—121)

This invention relates to sanitation, and more particularly to that branch of sanitation known as water purification, sometimes called water treatment.

The methods of water purification are normally grouped according to their accomplishment, and sub-grouped according to the way this purification is done. This classification of water purification is herein catalogued for the benefit of those who are not so experienced in the art in order that they will better understand the inventors system, as set forth in this specification and claims, as well as illustrated in the drawing.

The first step in the purification of water is the removal of floating material, and this is usually accomplished by screening. The second step is the removal of suspended solids and color, accomplished either by sedimentation, coagulation, or filtration. The third step is the removal of bacteria which is largely accomplished by the same steps given for the removal of suspended solids and color. The purification in this step is often supplemented by disinfection. The fourth step is the removal or neutralization of tastes, odors, and objectionable minerals, either by aeration, treating the water with certain chemicals, or by the use of special equipment and/or methods. The fifth and last step in water purification is the removal of hardness, which is usually done by softening the water.

Water purification plants are not always needed to perform all five of the above noted steps in the art, since the water they are purifying may not contain all of the objectionable materials. Unfortunately, few, if any, purification systems are commercially obtainable that will in fact accomplish more than one of the above noted steps in water purification without the additional expenditure of money for added equipment. This equipment is not only costly to obtain, install, and maintain, but also requires additional space, which is sometimes not available without considerable difficulty, if at all.

It is, therefore, the principal object of this invention to provide a water purification system that contains the essential elements necessary to remove bacteria and to filter water; for drinking, and for other general home consumption.

Another object of this invention is to provide a water purification system of simplified construction for use on lands not served by municipal or district sewer systems, and where soil conditions are not suitable for septic tank drainage.

Another object of this invention is to provide a water purification system having but five basic units comprising two septic tanks, a holding tank, a sand filter, and a drainage pit, all of which are connected together in the manner shown in the accompanying drawing and described in the specification.

Another object of this invention is to provide a water purification system that can be installed by anyone without the necessity of first obtaining an education in the art of sanitation.

Another object of this invention is to provide a water purification system that embodies the use of standard parts, readily obtainable at any nearby hardware store or plumbing supply house.

Still another of the objects of this invention is to provide a water purification system having a filter that can be located either above or below the ground.

Still another object of this invention is to provide a water purification system having a uniform flow of water through the filter during the filtration process.

Yet another object of the invention is to provide a water purification system in which the filter is back flushed after each use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention, wherein:

FIGURE 1 is a side view of this invention, a large part of which is shown embedded in the ground.

FIGURE 2 is a sectional view of that part of this invention known as the sand filter.

In the present invention, two septic tanks are provided. The first tank is indicated by the reference numeral 5 having the usual partition 5', and the second tank is indicated by the reference numeral 6 on the accompanying drawing, said second tank 6 having the usual partition 6', where in FIGURE 1 it is seen that septic tank 5 is provided with an inlet waterpipe 7 on the left side thereof, while the same tank is connected to the second septic tank 6 by means of a pipe 8 that is preferably four inches in diameter, and which has a U-shaped trap 9 in the center thereof, as well as a vertically disposed air vent 10. This air vent 10 is located between the aforesaid U-shaped trap 9 and the septic tank 6, which in turn is connected to the upper side of the holding tank 11 by the pipe 12, having a U-shaped trap 13 in the center thereof. The holding tank 11 is connected to the automatic chlorinator 14 that is mounted on the side of the sand filter 15 by means of the vertical pipe 16 that projects upward from the top 17 of the aforesaid holding tank 11, as does the air vent 18. The sand filter 15 is provided with a centrally located inlet 19 that projects downward from the center sloping bottom 20, and which is connected to the outlet of the centrifugal pump 21 by a pipe 22. Pump 21 has its inlet entering into the lower right hand side of the holding tank 11 which is provided with a bottom 23 that is similar in every respect to that of the bottom 20 of the aforesaid sand filter 15. The outside center of bottom 23 of the holding tank 11 is provided with drain valve 24 having a manually operated drain valve control 25 that projects outward and upward through the ground 26. The drain valve 24 is also connected to a drainage pit 27 by means of the outlet pipe 28.

Continuing to examine the drawing, one will see that the second mentioned septic tank 6 is provided with an air pump 29 that is mounted on the top 30 of the just mentioned septic tank 6, and that vertical outlet pipe 31 extends downward into the tank from the air pump. The pipe 31 terminates in a horizontal pipe 32. A filter effluent outlet 33, projects horizontally out from the upper portion of one side of the aforesaid sand filter 15, which is shown as cross section in FIGURE 2 of the drawing, where it is seen that this sand filter contains a bottom layer of coarse gravel 34 that rests on top of a perforated bottom plate 35. Coarse sand or fine gravel 36 is next placed on top of the coarse gravel 34, and is followed by body layer of sand 37, that is topped off with a second layer of coarse sand or fine gravel 38. These just described ingredients of the sand filter can vary in arrangement and contents, as well as be understood by anyone having experience in the art of filtering water and the like through sand.

A float operated switch 39 is located in holding tank 11. Switch 39 closes to start pump 21 when the holding tank 11 is full, and stops pump 21 when holding tank 11 is empty.

Arrowed lines indicated in FIGURE 1 the direction of flow of the water that passes through this new and novel system that is obviously made up from easily obtainable standard parts in a way that has never been done before, in order to provide a simplified and trouble free system of water purification that has required a high degree of inventive skill to produce.

The actual way in which this invention of a water purification system functions is as follows. Liquid passes through inlet pipe 7 into septic tank 5. In septic tank 5, the liquid is subject to the usual bacterial action. The overflow from septic tank 5 passes through pipe 8 and trap 9 into septic tank 6. In septic tank 6, the liquid is aerated by air pump 29 and pipes 31 and 32. Vent pipe 10 vents septic tank 6. The output of septic tank 6 passes through pipe 12 and trap 13 into holding tank 11. Tank 11 is vented by pipe 18; the liquid in tank 11 is chlorinated by automatic chlorinator 14. This may occur just before tank 11 is full. When tank 11 is nearly full, float operated switch 39 closes to start pump 21. Pump 21 pumps the contents of holding tank 11 into sand filter 15. The liquid that passes through filter 15 passes out of effluent pipe 33. This liquid is safe to flow into any stream. It could be used for other purposes such as irrigation. When holding tank 11 is empty, float operated switch 39 stops pump 21. The liquid which remains in filter 15 will pass back through the filter, through outlet 19, pipe 22, and pump 21 into tank 11. This will back flush the filter. As soon as tank 11 fills up again, the operation is repeated. Sludge will collect in the bottom of septic tanks 5 and 6. This will be pumped out periodically. Sludge will also collect in the bottom of tank 11. This sludge can be removed by opening valve 24 to allow the sludge to pass through pipe 28 into drainage pit 27.

Having now described my invention of a water purification system in the preferred form, what I now claim as new and desire to secure by Letters Patent is:

1. A water purification system, comprising a septic tank having an inlet opening and an outlet opening, means connecting said inlet opening to a source of water which is to be purified, a holding tank having an inlet opening, a pipe connecting the outlet opening of the septic tank to the inlet opening of the holding tank, a filter tank located above the holding tank, filter material in the filter tank, a filter outlet pipe connected to the filter tank near the top thereof, a filter inlet pipe connected to the bottom of the filter tank, an electric pump having its output connected to the filter inlet pipe, a pipe connected to the holding tank near the bottom thereof and connected to the inlet of the pump and means including a float operated switch connected to the holding tank and to the pump for actuating said pump at a first predetermined liquid level in said holding tank to pump liquid from the holding tank to the filter tank and for deactuating said pump at a second predetermined liquid level in said holding tank to allow liquid in said filter tank to flow by gravity from said filter tank through said pump and into said holding tank, a drainage pit located below said holding tank, a pipe connecting the bottom of said holding tank to said drainage pit, and a valve in the last mentioned pipe.

2. The combination of claim 1 in which the inlet to the holding tank is near the top thereof.

References Cited by the Examiner
UNITED STATES PATENTS

| | | | |
|---|---|---|---|
| 691,365 | 1/1902 | Dittler | 210—199 |
| 874,542 | 12/1907 | Russell | 210—259 |
| 1,058,458 | 4/1913 | Payne et al. | 210—259 X |
| 1,120,351 | 12/1914 | Weston | 210—257 X |
| 1,195,391 | 8/1916 | Newman | 210—275 X |
| 1,629,085 | 5/1927 | Robertson | 210—290 |
| 1,787,698 | 1/1931 | Montgomery | 210—290 |
| 2,760,643 | 8/1956 | Schaaf | 210—275 |
| 3,047,492 | 7/1962 | Gambrel | 210—195 X |
| 3,054,602 | 9/1962 | Proudman | 210—218 X |
| 3,080,315 | 3/1963 | Silvey | 210—62 |
| 3,171,804 | 3/1965 | Rice | 210—290 X |
| 3,232,434 | 2/1966 | Albersmeyer | 210—151 |

REUBEN FRIEDMAN, *Primary Examiner.*

SAMIH ZAHARNA, JAMES DECESARE,
*Assistant Examiners.*